United States Patent [19]

Nagano et al.

[11] Patent Number: 5,308,972
[45] Date of Patent: May 3, 1994

[54] MICROSCOPE USING PHOTOGRAPHING UNIT AND PHOTOMETER

[75] Inventors: Takashi Nagano; Toru Takahashi, both of Tokyo, Japan

[73] Assignee: Olympus Optical Co., Ltd., Tokyo, Japan

[21] Appl. No.: 986,246

[22] Filed: Dec. 7, 1992

[30] Foreign Application Priority Data

Dec. 12, 1991 [JP] Japan .................................. 3-328855

[51] Int. Cl.⁵ .............................................. H01J 3/14
[52] U.S. Cl. ...................................... 250/216; 356/219
[58] Field of Search ......................... 250/214 R, 216; 356/219, 227, 384; 359/381; 354/79

[56] References Cited

U.S. PATENT DOCUMENTS 3,851,949 12/1974 Kraft et al. ............................ 356/219
4,527,869 9/1985 Nihoshi .
4,586,188 2/1986 Weber et al. ......................... 356/384

FOREIGN PATENT DOCUMENTS 58-214121 12/1983 Japan .

Primary Examiner—David C. Nelms
Assistant Examiner—K. Shami
Attorney, Agent, or Firm—Frishauf, Holtz, Goodman & Woodward

[57] ABSTRACT

An apparatus for photographing an image of a sample observed through a microscope comprises a photometry region designating unit, an optical member for superimposing an image of an indicator light beam on an image of an object light beam, an area sensor, a reflecting member for reflecting the object light beam and the indicator light beam and guiding them to the area sensor, a photometry region determining unit, a photometry unit, and a photographing unit. The photometry region designating unit generates an indicator light beam which is movable in a plane perpendicular to the optical axis of the object light beam output from an objective lens. The photometry region determining unit stores a photometry signal supplied from the area sensor in correspondence with a position of a light receiving plane, detects the position of the light receiving plane, on which the indicator light is projected, by using the photometry signal, and determines a photometry region based on the detected position. The photometry unit measures the brightness of the photometry region determined by the photometry region determining unit and calculates a photometry value. The photographing unit photographs an image of the sample based on the photometry value.

16 Claims, 9 Drawing Sheets

MICROSCOPE USING PHOTOGRAPHING UNIT AND PHOTOMETER

BACKGROUND OF THE INVENTION

1. Field of the Invention

The present invention relates to a microphotographing apparatus which can photograph a sample observed through an eyepiece of a microscope, and more particularly to improvement of photometry for measuring the brightness of a desired portion of an object to be photographed.

2. Description of the Related Art

Generally known is a fluorescence microscope for observing a fluorescent sample of a protein or gene in which a fluorescent marker is added to an organic tissue or cell.

Recently, by a phase contrast microphotography or a differential interfere microphotography, or the combination thereof, it have been possible to stain a substance having only minute fluorescence in multicolor so as to accurately detect the positional relationship between the substance and another substance or to observe where the fluorescent colored substance is located in the cell structure.

In many cases of the above-mentioned fluorescent observation, a fluorescent portion is present in a limited portion of a dark background. To photograph such a fluorescent portion, it is necessary to measure the brightness of the image to be photographed in order to determine the exposure time.

According to the conventional photometry, an exposure time is determined on the basis of an average brightness in the field of a microscope. This method has a drawback that the fluorescent portion is lost in the photographed image.

To overcome this drawback, for example, Published Unexamined Japanese Patent Application (PUJPA) No. 58-214121 proposes an apparatus for observing a photometry region (a region the brightness of which is to be measured) through an eyepiece of a microscope, measuring the brightness of a desired portion of the observed portion, and determining the exposure time on the basis of the brightness data on the photometry region.

FIG. 10 shows an optical system of the microphotographing apparatus disclosed in the above mentioned application. A light beam is applied through a objective lens 1 to a first surface S1 of a quadrilateral prism 2, and output from a second surface S2 of the prism 2, which is parallel to the first surface S1. The light beam is reflected by first to third reflecting members M1 to M3 in sequence. The beam reflected by the third reflecting member M3 is incident on a third surface S3 of the quadrilateral prism 2 and output through a fourth surface S4 thereof. Then, the beam is guided to an eyepiece 3.

A reticle R for focusing the beam on an object and a photometry member 4 having a inclined semi-transparent portion for reflecting the beam are arranged between the second and third reflecting members M2 and M3. With this arrangement, an intermediate image I1 is formed on the reticle R.

A relay lens 5 is provided on the outgoing side of the photometry member 4, so that the intermediate image I1 formed on the reticle R is re-formed as an object image I2 before the eyepiece 3.

In the above-described optical system, the photometry member 4 (i.e. photometry prism) having a semi-transparent plane, which reflects a portion of the light beam corresponding to a photometry region, is movable with respect to the optical axis. By virtue of the photometry member 4, an indicator image indicating the photometry region is projected on the object image observed through the eyepiece 3 The indicator image is movable to a desired position on the object image by moving the photometry member 4 in a plane perpendicular to the optical axis.

The image in which the photometry region is designated is extracted from, for example, a first reflecting member M1, to determine the exposure time. When the image is photographed, the second reflecting member M2 is removed from the light path, an intermediate image I3 is formed on a film via a relay lens 6 and a shutter 7 is controlled in accordance with the exposure time.

However, in the above photographing apparatus, an intermediate image I1 is formed in the observing optical system and the reticle R for indicating a photometry region and the range of a photograph is provided in the observing optical system and the photographing optical system so that the user can observe the photometry region and the range of a photograph. For this reason, the relay lenses 5 and 6 are required for relaying the intermediate images 11 and 13, with the result that an observed image and a photographed image are degraded.

SUMMARY OF THE INVENTION

The present invention has been made in consideration of the above drawbacks, and its object is to provide a microphotographing apparatus by which a desired photometry region can be designated while the user is observing an image of a sample, without forming an intermediate image in the optical system, so that a clear image of the sample can be photographed.

According to a first aspect of the present invention, there is provided a microphotographing apparatus comprising:

a film medium having a film surface on which the image of the sample is formed, said film surface being located at a position where the object light beam output from the objective lens is focused;

a photometry region designating unit for generating an indicator light beam to designate a photometry region on an image of a sample, the photometry region designating unit being movable in a plane perpendicular to the optical axis of the light beam output from the objective lens;

a semi-transparent optical member for superimposing an indicator image on an object image, the semi-transparent optical member being removably inserted in a light path of the object light beam output from the objective lens and having a semi-transparent plane on which the object light beam and the indicator light beam are input in a state where the semi-transparent optical member is inserted in the light path;

an observing light path for guiding to the eyepiece the object light beam and the indicator light beam superimposed by means of the semi-transparent plane of the semi-transparent optical member;

a photographing light path for guiding to the film medium the object light beam and the indicator light beam superimposed thereon by means of the semi-transparent plane of the semi-transparent optical member;

a reflecting member, removably inserted in the photographing light path, for reflecting the object light beam and the indicator light beam passed through the photographing light path when the reflecting member is inserted in the photographing light path;

an area sensor, having a light receiving plane at a position where the object light beam reflected by the reflecting member is focused, for converting the image of the sample on which the indicator light beam is superimposed into an electrical photometry signal and outputting the photometry signal;

a photometry region determining unit for reading the photometry signal from the area sensor, storing the photometry signal in correspondence with a position on the light receiving plane, detecting the position on the light receiving plane on which the indicator light beam is projected, on the basis of the stored photometry signal, and determining a photometry region on the basis of the detected position;

a photometry unit for measuring the brightness of the photometry region determined by the photometry region determining unit, thereby obtaining a photometry value; and a photographing unit for photographing the image of the sample based on the photometry value obtained by the photometry unit.

With the above arrangement, the sample image passed through the objective lens is split by the semi-transparent optical member. One of the split image is guided to the eyepiece through the observing light path. The other is reflected by the reflecting member and focused on the area sensor, while being guided through the photographing light path to the film medium.

The indicator image generated by the photometry region designating unit is superimposed on the object image by the semi-transparent optical member, and guided to the observing light path and the photographing light path. As a result, the indicator image is superimposed on the same portion of the sample image in both light paths.

In this state, the indicator image is moved in a direction perpendicular to the optical axis by the photometry region designating unit, thereby moving the indicator image on the sample image in the observing light path and the area sensor.

Thus, a photometry region can be designated at a desired position on the image of the sample by operating the photometry region designating unit, while the user is observing the sample image and the indicator image projected thereon through the eyepiece which faces the image formation position in the optical light path.

The sample image on which the indicator image is projected is pickuped by the area sensor, which outputs an electric signal. The electric signal is input to the photometry region determining unit. Since the brightness of the portion at which the indicator image is formed on the sample image is much greater than the other portion, the photometry region determining unit can detect the position of the indicator image based on the output from the area sensor. The photometry region is determined on the basis of the position of the indicator image.

According to a second aspect of the present invention, there is provided a photographing apparatus comprising:

a film medium having a film surface on which the image of the sample is formed, said film surface being located at a position where the object light beam output from the objective lens is focused;

a photometry region designating unit for generating an indicator light to designate a photometry region on an image of a sample, said photometry region designating unit being movable in a plane perpendicular to the optical axis of the light beam output from the objective lens;

a prism, removably inserted in the light path of the object light beam output from the objective lens, having a first surface to which the object light beam from the objective lens is input, a second surface to which the indicator light beam from the photometry region designating unit is input, and a semi-transparent plane on which the object light beam input through the first surface and the indicator light beam input through the second surface are superimposed, said prism splitting each of the object light beam and the indicator light beam to a reflection component and a transmission component which are guided to the eyepiece and the film medium;

an observing light path for guiding to the eyepiece the object light beam and the indicator light beam superimposed by means of the semi-transparent plane of the prism;

a photographing light path for guiding to the film medium the object light beam and the indicator light beam superimposed by means of the semi-transparent plane of the prism;

a reflecting member, removably inserted in the photographing light path, for reflecting the object light and the indicator light passed through the photographing light path when the reflecting member is inserted in the photographing light path;

an area sensor, having a light receiving plane at a position where the object light beam reflected by the reflecting member is focused when the reflecting member is inserted in the photographing light path, for converting the image of the sample on which the indicator light beam is superimposed into an electrical photometry signal and outputting the photometry signal;

a photometry region determining unit for (reading the photometry signal from the area sensor?), storing the photometry signal in correspondence with a position on the light receiving plane, detecting the position on the light receiving plane on which the indicator light beam is projected, on the basis of the stored photometry signal, and determining a photometry region on the basis of the detected position;

a photometry unit for measuring the brightness of the photometry region determined by the photometry region determining unit, thereby obtaining a photometry value; and a photographing unit for photographing the image of the sample based on the photometry value obtained by said photometry unit.

With the above arrangement, the sample image passed through the objective lens is input to the first surface of the prism. The image is split by the semi-transparent plane into two object light beams; one is guided to the observing light path, and the other is guided to the photographing light path. The object light beam guided through the observing light path is focused on a predetermined portion and observed through the eyepiece. The object light beam guided through the photographing light path is reflected by the reflecting member and focused on the area sensor.

The indicator image generated by the photometry region designating unit is input to the second surface of the prism. The indicator image is superimposed on the object image by the prism, and guided to the observing light path and the photographing light path. As a result, the indicator image is superimposed on the same portion of the sample image in both light paths.

In this state, the indicator image is moved in a direction perpendicular to the optical axis by the photometry region designating unit, thereby moving the indicator image on the sample image in the observing light path and the area sensor.

Thus, a photometry region can be designated at a desired position on the image of the sample by operating the photometry region designating unit, while the user is observing the sample image and the indicator image projected thereon through the eyepiece which faces the image formation position in the optical light path.

The sample image on which the indicator image is projected is photographed by the area sensor, which outputs an electrical photometry signal. The photometry region is determined on the basis of the photometry signal, in the same manner as described above.

DETAILED DESCRIPTION OF THE PREFERRED EMBODIMENTS

Embodiments of the present invention will now be described.

Figure 1:
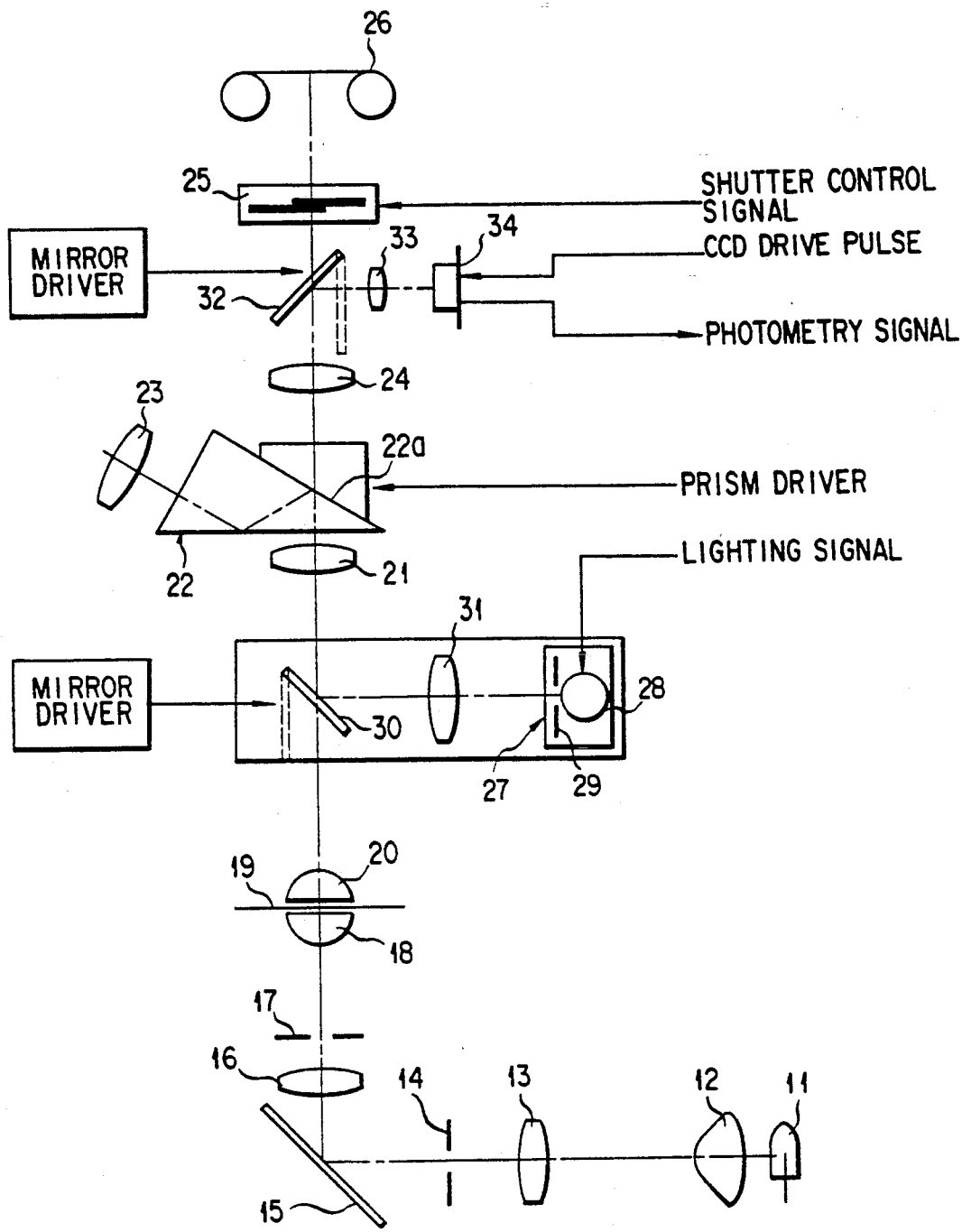
FIG. 1 is a diagram showing the optical system of a microphotographing apparatus according to a first embodiment of the present invention.
Figure 2:
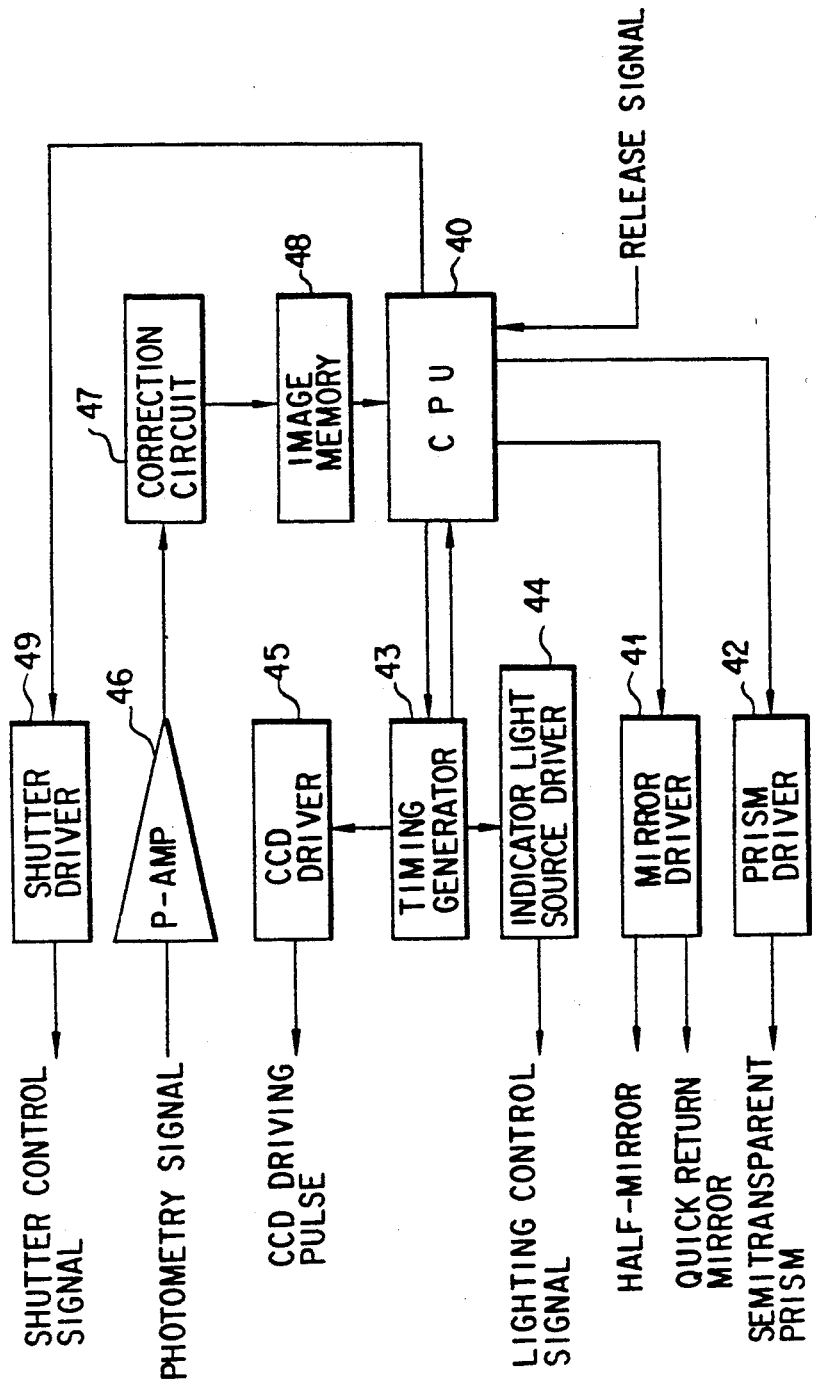
FIG. 2 is a diagram showing the electrical system of the microphotographing apparatus according to the first embodiment.

FIGS. 1 and 2 shows the optical and electrical systems of a microphotographing apparatus according to a first embodiment of the present invention.

First, the optical system of the microphotographing apparatus will be described with reference to FIG. 1. A light beam emitted from a light source 11 is applied to a reflecting mirror 15 through a collector lens 12, a relay lens 13, and a field stop 14. The reflecting mirror 15 reflects the light beam upward. The reflected light beam is applied to a condenser lens 18 through a relay lens 16 and a brightness stop 17. A sample 19 is uniformly irradiated from the bottom by mean of the condenser lens 18.

An objective lens 20 is arranged above the sample 19 on the side opposite to the condenser lens 18. The light incident on the objective lens 20 through the sample 19 is applied via an image formation lens 21 to a semi-transparent prism 22. The semi-transparent prism 22 causes a portion of the incident light beam to be reflected by a semi-transparent plane 22a, so that an enlarged image of the sample can be observed through an eyepiece 23.

A portion of the light beam passed through the semi-transparent plane 22a is guided through a photographing lens 24 and a shutter 25 to a film surface 26, thereby forming an image thereon.

The optical system of this embodiment also includes an indicator light source unit 27. The indicator light source unit 27 comprises an indicator light source 28 which is turned on and off under control of a lighting signal externally supplied thereto, and a indicator plate 29 having a pin hole or the like which defines the shape of an indicator image for designating a photometry region. The indicator plate 29 is movable in a desired direction in a plane perpendicular to the optical axis of the system.

A semi-transparent mirror 30 is removably inserted in the light path between the objective lens 20 and the semi-transparent prism 22. When the semi-transparent mirror 30 is inserted in the light path, it receives a light beam from the indicator light source unit 27 through a relay lens 31 and causes the light beam to be incident on the semi-transparent prism 22.

A quick return mirror 32 serving as a photometry optical member is removably inserted in the light path between the semi-transparent prism 22 and the film surface 26. The quick return mirror 32 is inserted in the light path when a photometry region is to be determined, so that a light beam passed through the semi-transparent prism 22 is reflected in a predetermined direction toward a photometry light path. An area sensor 34 is arranged in the photometry light path at conjugate position of the film surface 26.

The area sensor 34 is constituted by a CCD two-dimensional sensor of an interline type, and image data is read therefrom every line in response to a CCD drive pulse externally supplied.

It is obvious for a person skilled in the art to achieve the above-described operations of the supporting structure of the indicator plate 29 and the quick return mirror 32.

The electrical system of the microphotographing apparatus of this embodiment will now be described with reference to FIG. 2. CPU 40 supplies operation control signals to a mirror driver 41 and a prism driver 42 in accordance with the operations of various stages, for example, a photometry region detecting operation and a photographing operation. The mirror driver 41 inserts/removes the semi-transparent mirror 30 and the quick return mirror 32 in/from the light path in response to operation control signals from the CPU 40. The prism driver 42 removes the semi-transparent prism 22 from the light path and inserts an optical member for correcting the light path length in response to an operation control signal from the CPU 40. The optical member for correcting the light path length allows 100% passage of the sample image therethrough.

A timing generator 43 transmits a timing signal for turning on/off the indicator light source 28 to an indicator light source driver 44, in response to an instruction from the CPU 40. It also transmits a timing signal for instructing the area sensor 34 to read accumulated charges to a CCD driver 45.

The indicator light source driver 44 supplies a lighting control signal to the indicator light source 28 on the basis of the timing signal, thereby turning on/off the light source. The CCD driver 45 applies a CCD driving pulse to the area sensor 34 on the basis of the timing signal to read the accumulated charges from the area sensor 34 electrical signals (hereinafter referred to as "photometry signal").

The photometry signal is read from the area sensor 34 by the CCD driver 45 and input to a correction circuit 47 through a preamplifier 46. The correction circuit 47 subjects the photometry signal to correction processes for eliminating a fixed pattern noise and a dark current and stores the corrected photometry signal in an image memory 48.

The CPU 40 determines a photometry region based on the photometry signal read from the image memory 48 by using a photometry region determining function. It also detects the brightness of the photometry region and calculates an exposure time by using an exposure time calculating function. It controls a shutter driver 49 so as to open for a period of the calculated exposure time.

The principle of determining a photometry region of the above embodiment is as follows.

In this embodiment, the semi-transparent mirror 30 and the quick return mirror 32 are inserted in the light path, and the light source 11 and the indicator light source 28 are turned on. As a result, an image of the sample 19 uniformly irradiated by the light beam emitted from the light source 11 is incident on the semi-transparent prism 22. A part of the light beam is reflected by the semi-transparent plane 22a and an image of the sample is formed before the eyepiece 23 arranged in the observing light path. The remainder of the light beam passes through the semi-transparent plane 22a and is reflected by the quick return mirror 32. The reflected light beam is applied to the area sensor 34 arranged in the photometry light path and an image of the sample is formed on the sensor 34.

As a result, the images of the sample and the indicator are formed in an overlapping manner at the image formation planes in both the observing and photometry light paths. The user can observe the images through the eyepiece 23.

Since the indicator formed by the indicator light source unit 27 is a light spot, the portion at which the indicator is formed on each image formation plane is much brighter than the background.

The indicator is movable on the image of the sample by moving the indicator plate 29 in a direction perpendicular to the optical axis. Therefore, the indicator can be projected on a desired portion of the sample image while the user is observing the sample image.

As described above, the same image as observed through the eyepiece 23 is formed on the area sensor 34. When an image of the sample including the indicator is pickupped, the output of the light receiving element (pixel) corresponding to the portion at which the indicator is formed is much greater than the outputs of the other portions.

Figure 4A:
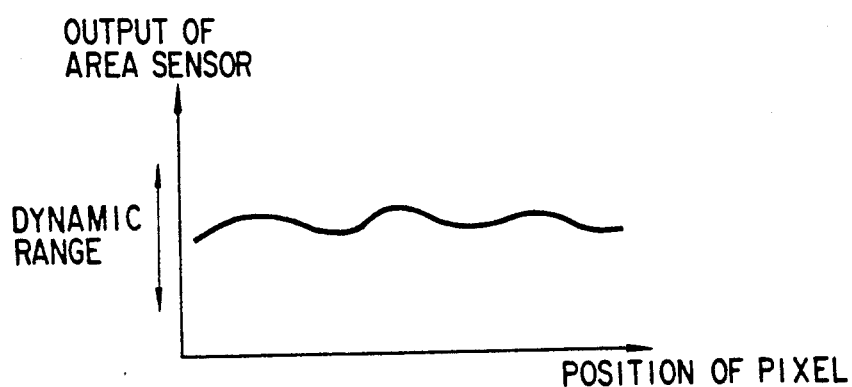
FIGS. 4A and 4B are diagrams respectively showing outputs of the area sensor in the cases where an indicator is present and not present.
Figure 4B:
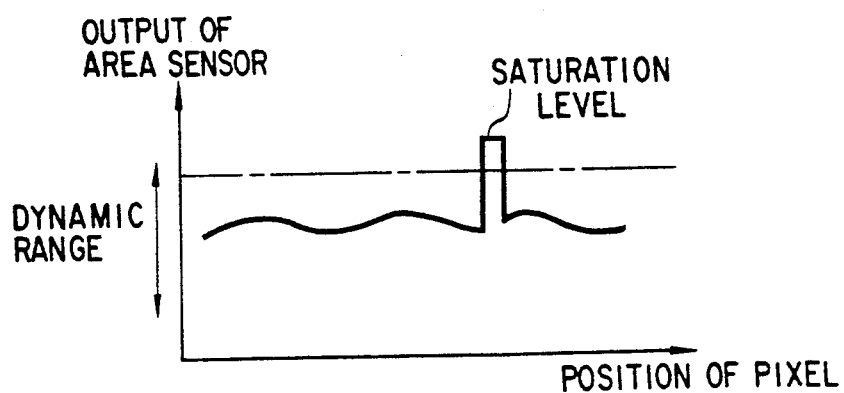

For example, assuming that when no indicator is projected on the sample, an output of the area sensor on a line is as shown in FIG. 4A, an output of the area sensor on the same line, when an indicator is projected, is as shown in FIG. 4B.

In general, a dynamic range is set in the area sensor 34 so that a pixel is not saturated when a sample of a normal brightness is pickupped. However, the pixel corresponding to the very bright indicator as described above is saturated. Thus, the position of the indicator can be detected by detecting a saturated pixel.

Besides, it is possible to detect the position of the indicator by subtracting the output of the area sensor shown in FIG. 4A from the output of the area sensor shown in FIG. 4B, or using a predetermined threshold value set with respect to the output of the area sensor shown in FIG. 4B.

When the position of the indicator is detected in the manners as described above, a region including at least one pixel adjacent to the position is determined as a photometry region.

An operation of this embodiment will now be described in detail. According to this embodiment, a photographing operation includes a photometry region designating step, a photometry region detecting step, a photometry step, an exposure time determining step, and a photographing step, in this sequence. These steps will be described with reference to the flowchart shown in FIG. 5.

In the photometry region designating step, the semi-transparent mirror 30, the semi-transparent prism 22, and the quick return mirror 32 are inserted in the light path, and the light source 11 and the indicator light source 28 are turned on. As a result, the user is able to observe an image consisting of a sample image and an indicator image superimposed thereon through the eyepiece 23.

In this state, the indicator plate 29 is moved in a desired direction on a plane perpendicular to the optical axis, thereby forming the indicator image on a desired portion of the sample image. When a photometry region is determined, the indicator light source 28 is turned off.

Figure 3:
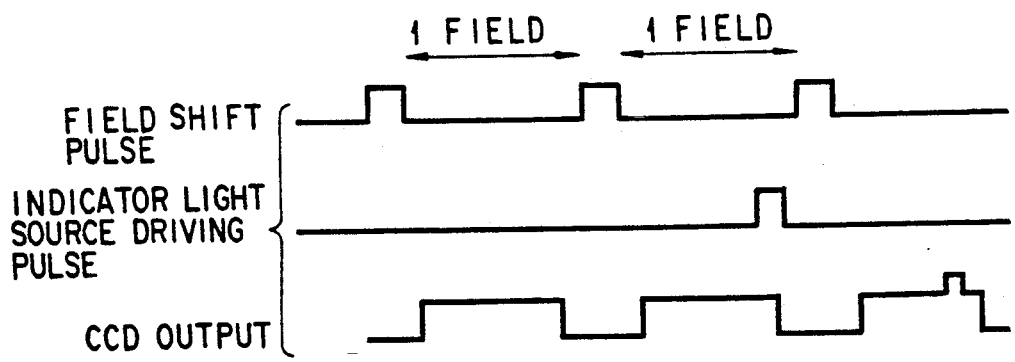
FIG. 3 is a timing chart showing an operation of the area sensor of the microphotographing apparatus according to the first embodiment.

Next, a release signal is input to the CPU 40. From this time the photometry region detecting step starts. In this step, a first photometry signal is read from the area sensor 34 at a timing as shown in FIG. 3.

The indicator light source 28 is turned on for a period of time t, which is required to saturate the output of the area sensor 34 within a storage time T in one field. A photometry signal for one field output from the area sensor 34 is stored in the image memory 48 in response to a field shift pulse output immediately after the indicator light source 28 is turned on to detect a saturated pixel. A predetermined region including the pixel is determined as a photometry region, and the address of the pixel in the region is stored in the image memory 48.

Next, in the photometry step, the indicator light source 28 is turned off. Thereafter, the sample image excluding the indicator image is pickupped by the area sensor 34. In the same manner as described above, a second photometry signal for one field is stored in the image memory 48. A photometry signal of the address of the pixel of the photometry region obtained in the above photometry region detecting step is extracted from the photometry signal for one field.

Subsequently, in the exposure time determining step, an exposure time is calculated on the basis of the following equation:

*Exposure Time=K/(α×Film Sensitivity ×Luminance×Collection Value)* where K represents a constant, α represents a reciprocity, Luminance is a product of the photometry signal and the sensitivity, and Collection Value is determined in accordance with the transmittance values of the semi-transparent mirror and the objective lens.

In the photographing step, the semi-transparent mirror 30, the semi-transparent prism 22, and the quick return mirror 32 are removed from the light path to the positions represented by the dot lines shown in FIG. 1. An optical member for correcting the light path, which allows 100% passage of the image of the sample, is inserted in place of the semi-transparent prism 22. The shutter 25 is opened for the exposure time calculated as above, thereby performing a photographing operation.

Figure 5:
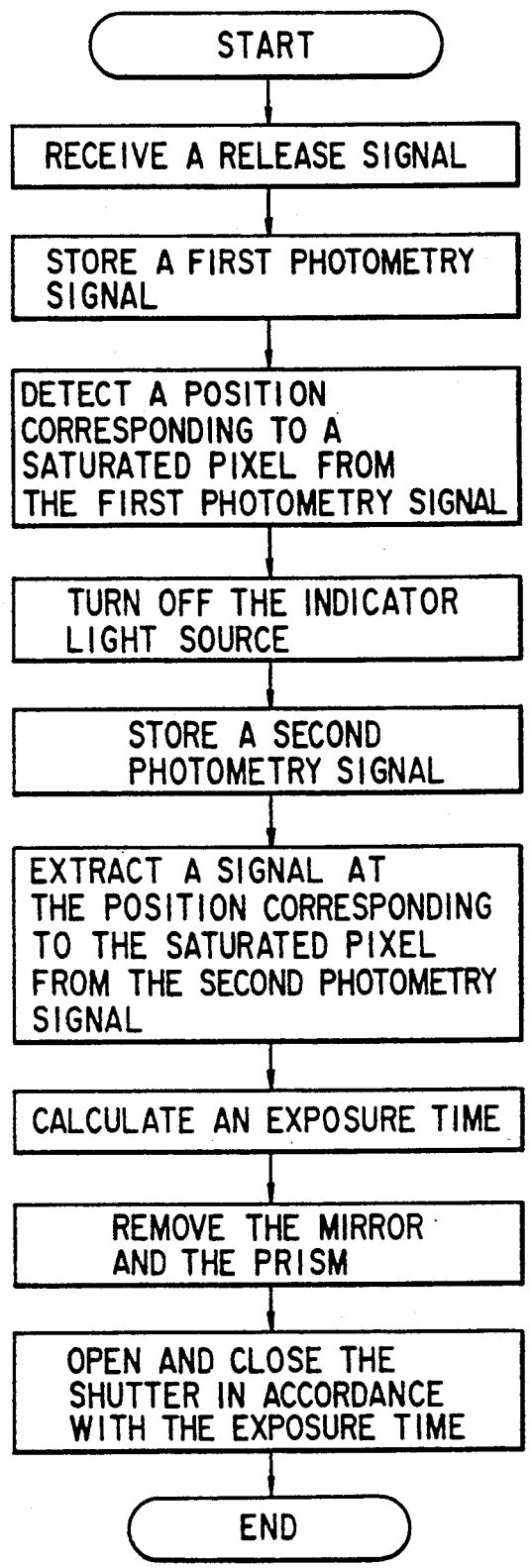
FIG. 5 is a flowchart showing a photographing operation of the microphotographing apparatus according to the first embodiment.

The flowchart of FIG. 5 shows an example of an operation of detecting a saturation level to detect a position at which an indicator image is formed in a sample image. The other two methods for detecting a position of the indicator as mentioned above are shown in FIGS. 6 and 7.

Figure 6:
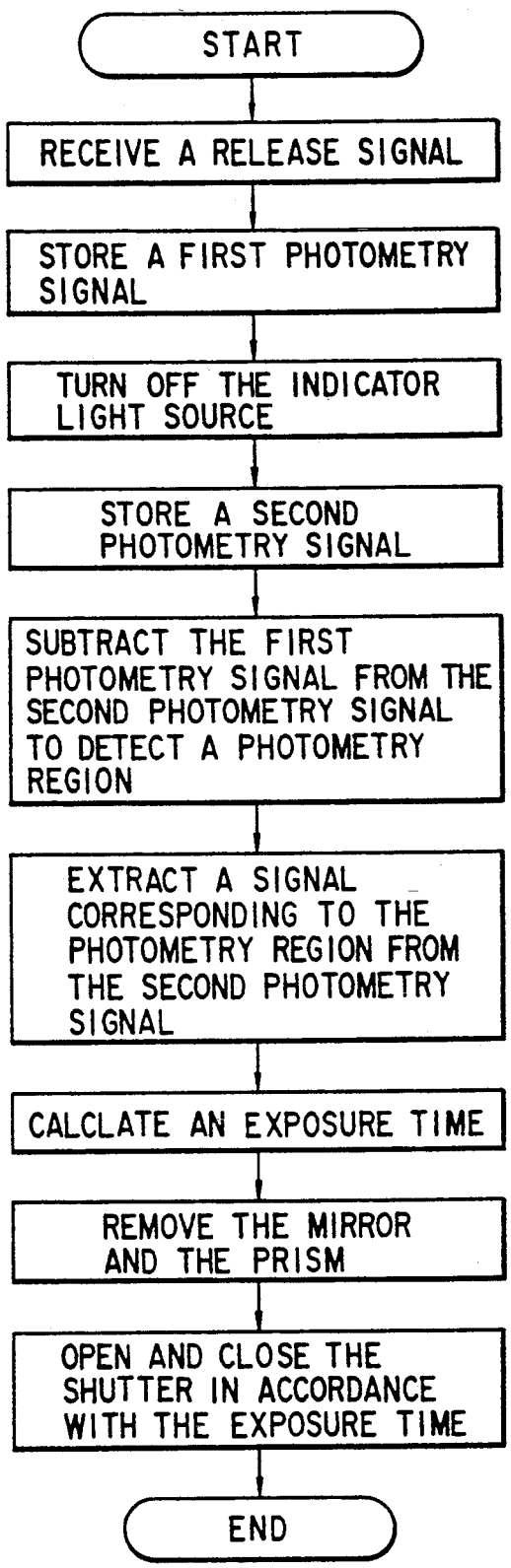
FIG. 6 is a flowchart showing a photographing operation of the microphotographing apparatus according to the first embodiment, employing a photometry region detecting method different from that employed in the operation shown in FIG. 5.

FIG. 6 is a flowchart showing an operation of detecting an indicator formation position by subtracting a first photometry signal in a case where an indicator is projected from a second photometry signal in a case where no indicator is projected. In this operation, the photometry region designating and detecting steps are the same as described above, i.e., a first photometry signal is stored in the image memory in the same manner.

Then, the indicator light source is turned off, and thereafter a second photometry signal is stored in the image memory. The first photometry signal generated when an indicator is projected is subtracted from the second photometry signal generated when no indicator is projected.

Since the first and second photometry signals except for the indicator formation position have substantially the same signal value, the subtraction value is approximately 0. In other words, only the pixel output corresponding to the indicator formation position represents an absolute value greater than a predetermined level. Thus, a pixel which represents an absolute value greater than a predetermined level can be detected and a region adjacent to the pixel is determined as a photometry region.

Next, a pixel output of the photometry region is extracted from the second photometry signal. Based on the output, the exposure time is calculated in the same manner as described above. The subsequent steps are the same as described above.

Figure 7:
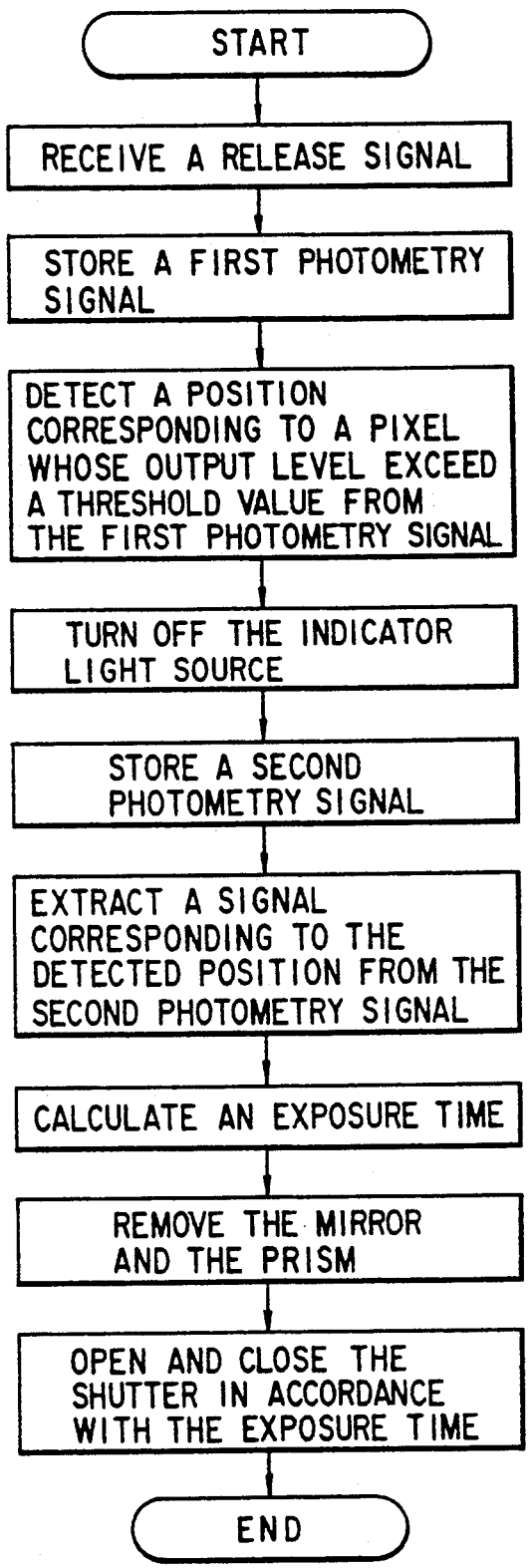
FIG. 7 is a flowchart showing a photographing operation of the microphotographing apparatus according to the first embodiment employing a photometry region detecting method different from those employed in the operations shown in FIGS. 5 and 6.

FIG. 7 is a flowchart showing an operation of detecting a indicator formation position by comparing a photometry signal generated when an indicator is projected with a threshold value of a predetermined level. In this operation, a first photometry signal is stored in the image memory and the output of each pixel is compared with a predetermined threshold value slightly smaller than the saturation level. Since the output of the pixel corresponding to the indicator formation position greatly exceeds the dynamic range, a pixel having an output level which exceeds the threshold value is determined to be an indicator formation position.

Thereafter, the indicator light source 28 is turned off, and a second photometry signal is stored in the image memory. Then, an exposure time is calculated on the basis of the pixel output in the photometry region.

According to this embodiment as has been described above an image of a sample output from the objective lens 20 is guided by the semi-transparent prism 22 to the observing light path. The sample image passed through the semi-transparent prism 22 is further guided by the quick return mirror 32 to the photometry light path. The indicator image formed by the indicator light source unit 27 is projected on the image of the sample by means of the semi-transparent mirror 30 arranged between the objective lens 20 and the semi-transparent prism 22. Hence, the indicator image can be formed at a desired position in the sample image without forming an intermediate image in the optical system. Since it is unnecessary to relay an intermediate image with a relay lens to re-form the image at a predetermined position, the image can be observed and photographed clearly.

Figure 8:
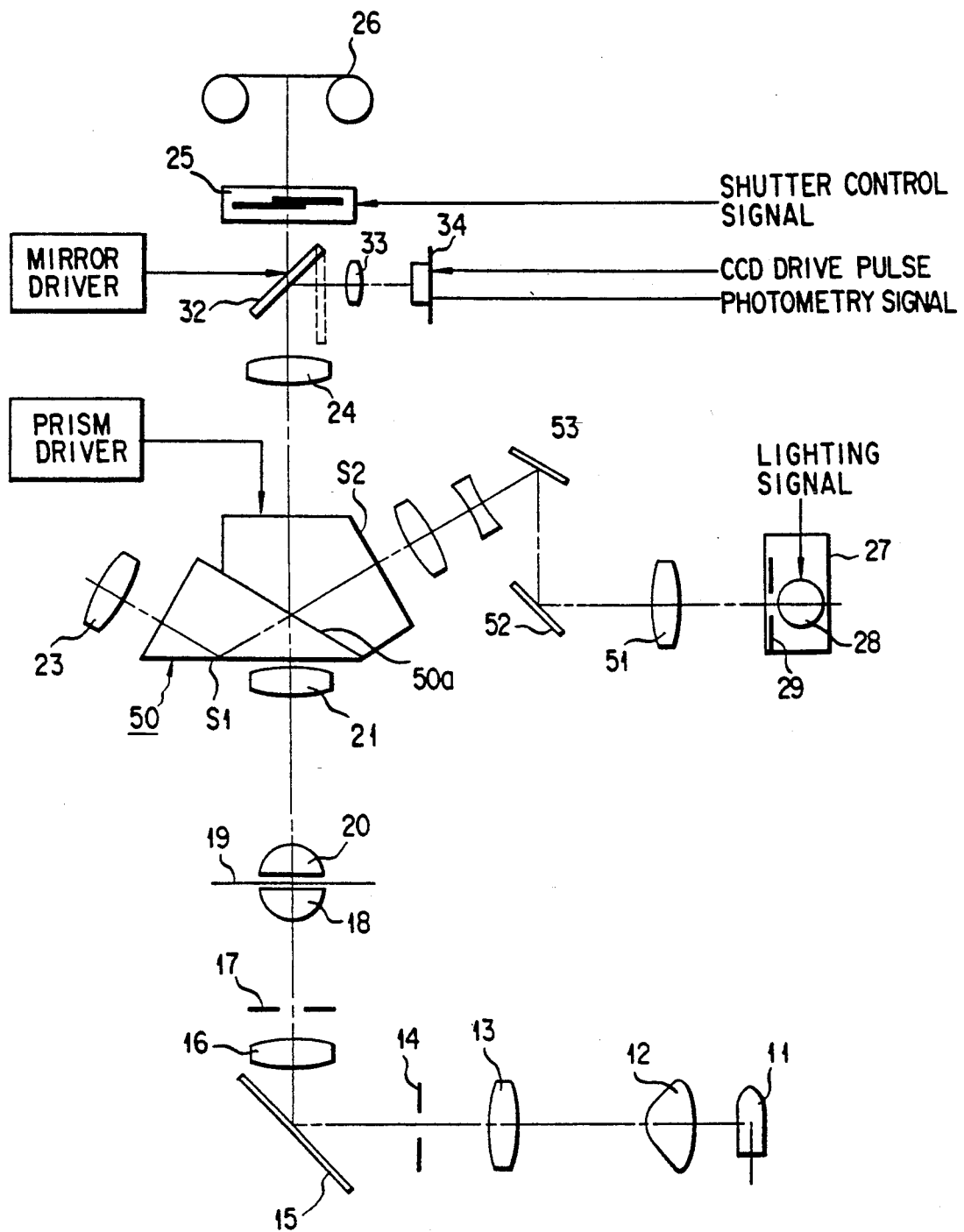
FIG. 8 is a diagram showing the optical system of a microphotographing apparatus according to a second embodiment of the present invention.

A second embodiment of the present invention will be described with reference to FIG. 8, wherein like components are identified with like reference numerals as in the first embodiment.

The microphotographing apparatus according to this embodiment has a semi-transparent prism 50 inserted between an objective lens 20 and a quick return mirror 32. An indicator image formed by an indicator light source unit 27 is incident on the semi-transparent prism 50 through a relay lens 51 and reflecting members 52 and 53.

The semi-transparent prism 50 has a semi-transparent plane 50a for splitting an input light beam into a reflection component and a transmission component. A light beam of a sample image which is input to a first surface S1 on the objective lens side and a light beam of an indicator image which is input to a second surface S2 are each separated into the two components by the semi-transparent plane 50a. The reflection component of the light beam of the sample image is guided to an observing light path on the side of an eyepiece 23, and the transmission component thereof is guided to a photographing light path. The reflection component of the light beam of the indicator image is guided to the photographing light path and the transmission component thereof is guided to the observing light path.

By virtue of the second surface S2 of the semi-transparent prism 50, an indicator image input thereto is projected on a sample image without using a semi-transparent mirror.

The electrical component of the second embodiment is basically the same as that shown in FIG. 2, although a function of controlling a semi-transparent mirror is unnecessary.

In this embodiment, the same effect as in the first embodiment is obtained. Since it is unnecessary to use a semi-transparent mirror, a controller therefor is also unnecessary, with the result that the control system is simplified.

Figure 9:
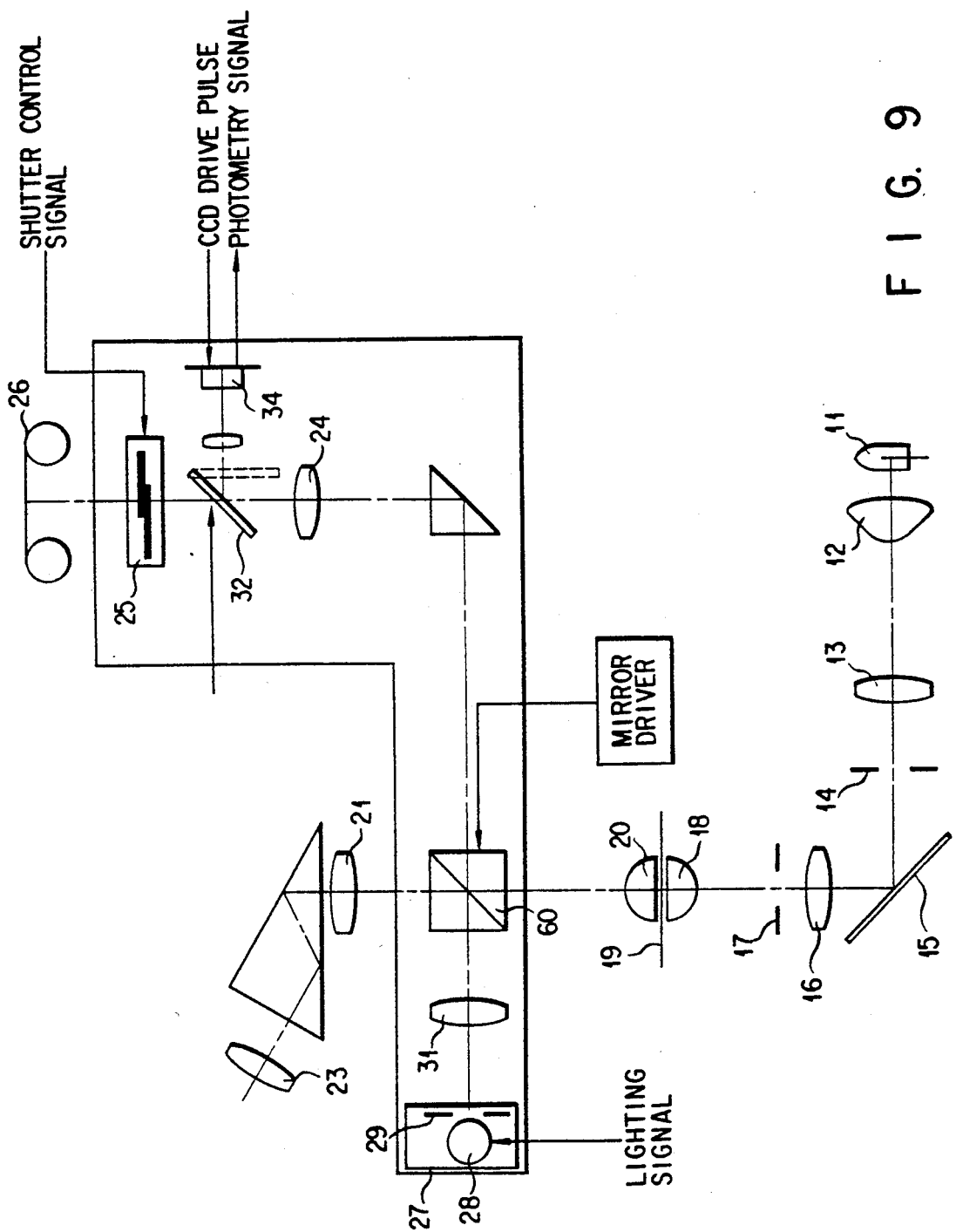
FIG. 9 is a diagram showing the optical system of a microphotographing apparatus according to a third embodiment of the present invention.
Figure 10:
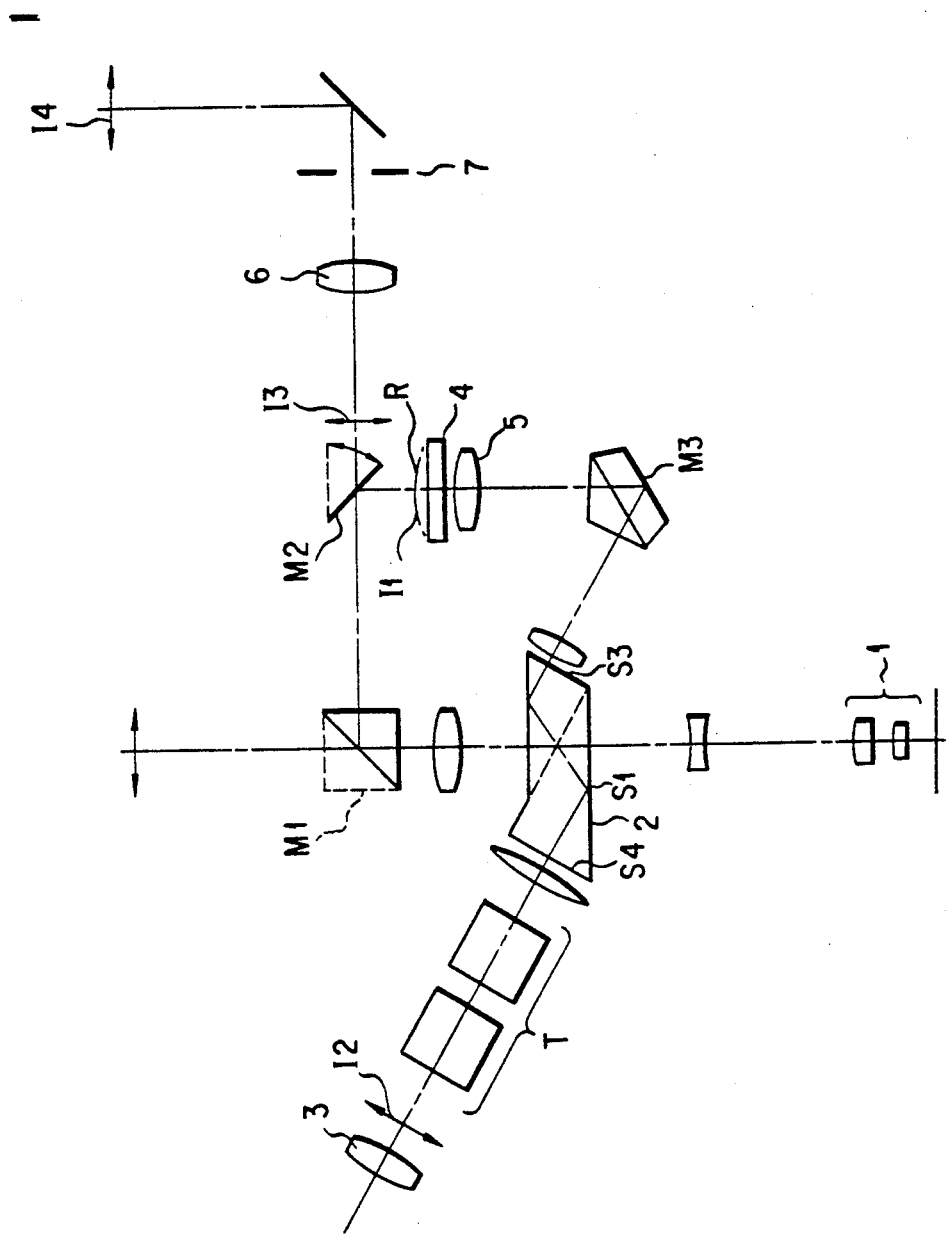
FIG. 10 is a diagram showing the optical system of a conventional microphotographing apparatus.

A third embodiment of the present invention will be described with reference to FIG. 9, wherein like components are identified with like reference numerals as in the first embodiment.

The microphotographing apparatus according to this embodiment has a semi-transparent mirror 60. The semi-transparent mirror 60 splits a light beam of a sample image from the objective lens into a transmission component which is guided to an observing light path and a reflection component which is guided to a photographing light path. The semi-transparent mirror 60 also splits a light beam of an indicator image from the indicator light source unit 27 into a transmission component which is guided to the photographing light path and a reflection component which is guided to the observing light path. In summary, the semi-transparent mirror has the same function as the semi-transparent prism 50 of the second embodiment.

The semi-transparent mirror 60 and a quick return mirror 32 are inserted in the light path in a photometry step, and removed therefrom in a photographing step. In the photographing step, the semi-transparent mirror 60 is replaced by a mirror which entirely reflects a sample image from the objective lens 20 toward the photographing light path.

According to the third embodiment, since it is only necessary to drive the quick return mirror 32 and the semi-transparent mirror 60, control of the mirrors can be simplified.

In the above embodiments, transmission type illumination is employed. However, reflected illumination may be used instead.

The present invention is not limited to the above embodiments, but various modifications may be made within the spirit and scope of the invention.

As has been described above, the present invention provides a microphotographing apparatus by which a desired photometry region can be designated while the user is observing an image of a sample, without forming an intermediate image in the optical system, so that a clear image of the sample can be photographed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A photographing apparatus applied to a microscope having an objective lens to which an object light from a sample is input and an eyepiece for observing an image of the sample formed at a predetermined image formation position, said photographing apparatus being adapted for photographing the image of the sample observed through said eyepiece, comprising:

a film medium having a film surface on which the image of the sample is formed, said film surface being located at a position where the object light output from said objective lens is focused;

a photometry region designating means for generating an indicator light beam to designate a photometry region on the image of the sample, said photometry region designating means being movable in a plane perpendicular to a optical axis of the object light output from said objective lens;

a semi-transparent optical means for superimposing the indicator light beam on the object light, said semi-transparent optical means being removably inserted in a light path of the object light output from the objective lens and having a semi-transparent plane on which the object light and the indicator light beam are input in a state where said semi-transparent optical means is inserted in the light path;

an observing light path for guiding to said eyepiece the object light and the indicator light beam thereon superimposed by means of the semi-transparent plane of said semi-transparent optical means;

a photographing light path for guiding to said film medium the object light and the indicator light beam superimposed thereon by means of the semi-transparent plane of said semi-transparent optical means;

reflecting means, removably inserted in the photographing light path, for reflecting the object light and the indicator light beam passed through the photographing light path when the reflecting means is inserted in the photographing light path;

area sensor means, having a light receiving plane at a position where the object light reflected by said reflecting means is focused, for converting the image of the sample on which the indicator light beam is superimposed into an electrical photometry signal and outputting the photometry signal;

a photometry region determining means for reading the photometry signal from said area sensor means, storing the photometry signal in correspondence with a position on the light receiving plane, detecting the position on the light receiving plane on which the indicator light beam is projected, on the basis of the stored photometry signal, and determining a photometry region according to the detected position;

a photometry means for measuring the brightness of the photometry region determined by said photometry region determining means, thereby obtaining a photometry value; and a photographing means for photographing the image of the sample based on the photometry value obtained by said photometry means.

2. A photographing apparatus according to claim 1, wherein said photometry region designating means comprises a indicator light source for emitting a light to form the indicator light beam and an indicator plate which has a hole corresponding to the diameter of the indicator light beam and which is supported so as to be movable in a plane perpendicular to the optical axis of the object light.

3. A photographing apparatus according to claim 1, wherein said photometry region determining means reads the photometry signal from said area sensor means when the object light and the indicator light beam are projected in an overlapping manner on the light receiving plane of said area sensor means, and determines the photometry region on the basis of the position of the light receiving plane which corresponds to a saturated portion of the photometry signal.

4. A photographing apparatus according to claim 1, wherein said photometry region determining means calculates a difference between a first photometry signal which is read from said area sensor means when the object light and the indicator light beam are projected in an overlapping manner on the light receiving plane of said area sensor and a second photometry signal which is read from said area sensor means when only the object light is projected on the light receiving plane of said area sensor, and determines the photometry region on the basis of the difference.

5. A photographing apparatus according to claim 1, wherein said photometry region determining means reads the photometry signal from said area sensor means when the object light and the indicator light beam are projected in an overlapping manner on the light receiving plane of said area sensor means, compares the photometry signal with a predetermined threshold value, and determines the photometry region on the basis of the position of the light receiving plane corresponding to a portion of the photometry signal which exceeds the threshold value.

6. A photographing apparatus according to claim 1, wherein said observing light path and said photographing light path have a common light path at end portions thereof on the objective lens side, and an optical splitting member is arranged in the common light path at the junction of said observing light path and said photographing light path, said optical splitting member splitting each of the object light beam and the indicator light beam into two components, so that one component of the object light and one component of the indicator light beam are guided to said eyepiece and the other component of the object light and the other component of the indicator light beam are guided to said photographing light path.

7. A photographing apparatus according to claim 6, wherein said optical splitting member comprises a semi-transparent prism having a first surface which faces said objective lens, a second surface, arranged at a predetermined angle with the first surface, for reflecting portion of the light input to the first surface and allowing passage of the other portion thereof, a third surface for guiding the portion of the light reflected by the second surface to said eyepiece, and a fourth surface for guiding the portion of the light passed through the second surface to said photographing light path.

8. A photographing apparatus according to claim 7, wherein:
said semi-transparent prism is removably inserted in the common light path; and
said semi-transparent optical means, said semi-transparent prism, and said reflecting means are inserted in the corresponding light paths when a photometry region is to be designated by means of said photometry region designating means, and at least said semi-transparent optical means and said reflecting means are removed from the corresponding light paths when the image of the sample is to be photographed.

9. A photographing apparatus according to claim 7, wherein:
said semi-transparent prism is removably inserted in the common light path; and
an optical member is inserted in the common light path in order to correct the light path length, when said semi-transparent prism is removed from the common light path.

10. A photographing apparatus according to claim 1, wherein said semi-transparent optical means comprises by a beam splitter having a first surface to which the object light beam from said objective lens is input, a second surface to which the indicator light from said photometry region designating means is input, and a semi-transparent surface for splitting each of the object light and the indicator light beam to a reflection component and a transmission component.

11. A photographing apparatus applied to a microscope having an objective lens to which an object light from a sample is input and an eyepiece for observing an image of the sample formed at a predetermined image formation position, said photographing apparatus being adapted for photographing the image of the sample observed through said eyepiece, comprising:
a film medium having a film surface on which the image of the sample is formed, said film surface being located at a position where the object light output from said objective lens is focused;
a photometry region designating means for generating an indicator light beam to designate a photometry region on the image of the sample, said photometry region designating means being movable in a plane perpendicular to a optical axis of the object light output from said objective lens;
a prism means, removably inserted in the light path of the object light output from the objective lens, having a first surface to which the object light from the objective lens is input, a second surface to which the indicator light beam from said photometry region designating means is input, and a semi-transparent plane on which the object light input to the first surface and the indicator light beam input to the second surface are superimposed, said prism means splitting each of the object light and the indicator light beam to a reflection component and a transmission component which are guided to said eyepiece and said film medium;
an observing light path for guiding to said eyepiece the object light and the indicator light beam superimposed thereon by means of the semi-transparent plane of said prism means;
a photographing light path for guiding to said film medium the object light and the indicator light beam superimposed thereon by means of the semi-transparent plane of said prism means;
reflecting means, removably inserted in the photographing light path, for reflecting the object light and the indicator light beam passed through the photographing light path when the reflecting means is inserted in the photographing light path;
area sensor means, having a light receiving plane at a position where the object light beam reflected by said reflecting means is focused when said reflecting means is inserted in the photographing light path, for converting the image of the sample on which the indicator light beam is superimposed into an electrical photometry signal and outputting the photometry signal;
a photometry region determining means for reading the photometry signal from said area sensor means, storing the photometry signal in correspondence with a position on the light receiving plane, detecting the position on the light receiving plane on which the indicator light beam is projected, on the basis of the stored photometry signal, and determining a photometry region on the basis of the detected position;
photometry means for measuring the brightness of the photometry region determined by said photometry region determining means, thereby obtaining a photometry value; and photographing mean for photographing the image of the sample based on the photometry value obtained by said photometry means.

12. A photographing apparatus according to claim 11, wherein said photometry region designating means comprises a indicator light source for emitting a light to form a indicator light beam and an indicator plate which has a hole corresponding to the diameter of the indicator light beam and supported so as to be movable in a plane perpendicular to a optical axis of the object light.

13. A photographing apparatus according to claim 11, wherein said photometry region determining means reads the photometry signal from said area sensor means when the object light and the indicator light beam are projected in an overlapping manner on the light receiving plane of said area sensor means, and determines the photometry region on the basis of the position of the light receiving plane which corresponds to a saturated portion of the photometry signal.

14. A photographing apparatus according to claim 11, wherein said photometry region determining means calculates a difference between a first photometry signal which is read from said area sensor means when the object light and the indicator light beam are projected in an overlapping manner on the light receiving plane of said area sensor and a second photometry signal which is read from said area sensor means when only the object light is projected on the light receiving plane of said area sensor, and determines the photometry region on the basis of the difference.

15. A photographing apparatus according to claim 11, wherein said photometry region determining means reads the photometry signal from said area sensor means when the object light and the indicator light beam are projected in an overlapping manner on the light receiving plane of said area sensor means, compares the photometry signal with a predetermined threshold value, and determines the photometry region on the basis of the position of the light receiving plane corresponding to a portion of the photometry signal which exceeds the threshold value.

16. A photographing apparatus according to claim 11, wherein said prism means and said reflecting means are inserted in the corresponding light paths when a photometry region is to be designated by means of said photometry region designating means, and at least said prism means and said reflecting means are removed from the corresponding light paths when the object light is to be photographed.

* * * * *